US010757456B2

(12) United States Patent
Wang et al.

(10) Patent No.: US 10,757,456 B2
(45) Date of Patent: *Aug. 25, 2020

(54) METHODS AND SYSTEMS FOR DETERMINING A LATENCY BETWEEN A SOURCE AND AN ALTERNATIVE FEED OF THE SOURCE

(71) Applicant: Shazam Investments Limited, London (GB)

(72) Inventors: Avery Li-Chun Wang, Palo Alto, CA (US); Ira Joseph Woodhead, San Francisco, CA (US); Christopher Matthew Healy, San Francisco, CA (US); Scott Edward Holechek, Jersey City, NJ (US)

(73) Assignee: Apple Inc., Cupertino, CA (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/156,673

(22) Filed: Oct. 10, 2018

(65) Prior Publication Data

US 2019/0124380 A1    Apr. 25, 2019

Related U.S. Application Data

(63) Continuation of application No. 15/793,319, filed on Oct. 25, 2017, now Pat. No. 10,129,575.

(51) Int. Cl.
*H04N 21/232*    (2011.01)
*H04N 21/24*    (2011.01)
(Continued)

(52) U.S. Cl.
CPC ....... *H04N 21/2407* (2013.01); *G06F 16/638* (2019.01); *H04H 60/31* (2013.01);
(Continued)

(58) Field of Classification Search
CPC ............ H04N 21/2407; H04N 21/232; H04N 21/233; H04N 21/2665; H04N 21/4394;
(Continued)

(56) References Cited

U.S. PATENT DOCUMENTS

| 4,450,531 A | 5/1984 | Kenyon |
| 4,843,562 A | 6/1989 | Kenyon |

(Continued)

OTHER PUBLICATIONS

Oostveen, et al., "Feature Extraction and a Database Strategy for Video Fingerprinting," Recent Advances in Visual Information Systems, 5th International Conference, VISUAL 2002, Lecture Notes in Computer Science, 2314, Mar. 11, 2002.

*Primary Examiner* — Nasser M Goodarzi
*Assistant Examiner* — Patrick A Ryan
(74) *Attorney, Agent, or Firm* — Blank Rome LLP

(57) ABSTRACT

An example method includes receiving queries from devices that include respective samples of content from a stream of content rendered by a source, receiving samples of content from a stream of content rendered by an alternative feed of the source, and for each sample of content from the alternative feed of the source, identifying respective matching queries that match to the same content as the sample of content from the alternative feed of the source. The method also includes for each respective matching query, determining a respective relative time difference between a time that the content appears in the sample of content from the alternative feed and a time that the content appears in the respective matching query, accumulating a distribution of the time differences over time, and determining a latency between the source and the alternative feed of the source.

20 Claims, 7 Drawing Sheets

(51) Int. Cl.
*H04N 21/233* (2011.01)
*G06F 16/638* (2019.01)
*H04N 21/2665* (2011.01)
*H04N 21/439* (2011.01)
*H04N 21/8547* (2011.01)
*H04N 21/81* (2011.01)
*H04H 60/31* (2008.01)
*H04H 60/58* (2008.01)
*H04N 5/60* (2006.01)

(52) U.S. Cl.
CPC ............... *H04H 60/58* (2013.01); *H04N 5/60* (2013.01); *H04N 21/232* (2013.01); *H04N 21/233* (2013.01); *H04N 21/2665* (2013.01); *H04N 21/4394* (2013.01); *H04N 21/812* (2013.01); *H04N 21/8547* (2013.01)

(58) Field of Classification Search
CPC .... H04N 21/8547; H04N 21/812; H04N 5/60; G06F 16/638; H04H 60/31; H04H 60/58
See application file for complete search history.

(56) References Cited

U.S. PATENT DOCUMENTS

| | | |
|---|---|---|
| 5,918,223 A | 6/1999 | Blum |
| 6,990,453 B2 | 1/2006 | Wang |
| 7,567,899 B2 * | 7/2009 | Bogdanov ............... G10L 25/48 704/231 |
| 7,627,477 B2 | 12/2009 | Wang |
| 8,290,423 B2 | 10/2012 | Wang |
| 9,552,617 B2 * | 1/2017 | Modro ............... G06K 9/00577 |
| 2007/0143777 A1 | 6/2007 | Wang |
| 2007/0271300 A1 * | 11/2007 | Ramaswamy ......... H04H 60/40 |
| 2008/0263360 A1 | 10/2008 | Haitsma |
| 2010/0115542 A1 * | 5/2010 | Lee ..................... G06K 9/0053 725/19 |
| 2010/0145708 A1 | 6/2010 | Master |
| 2010/0211693 A1 * | 8/2010 | Master .................... G10L 25/51 709/238 |
| 2011/0276333 A1 * | 11/2011 | Wang ..................... G10L 25/48 704/270 |
| 2012/0239175 A1 * | 9/2012 | Mohajer ............... H04H 60/372 700/94 |
| 2012/0317241 A1 * | 12/2012 | Wang ................. G06Q 30/0241 709/219 |
| 2014/0280265 A1 | 9/2014 | Wang |
| 2016/0314794 A1 | 10/2016 | Leitman |
| 2016/0381436 A1 | 12/2016 | Yu |

* cited by examiner

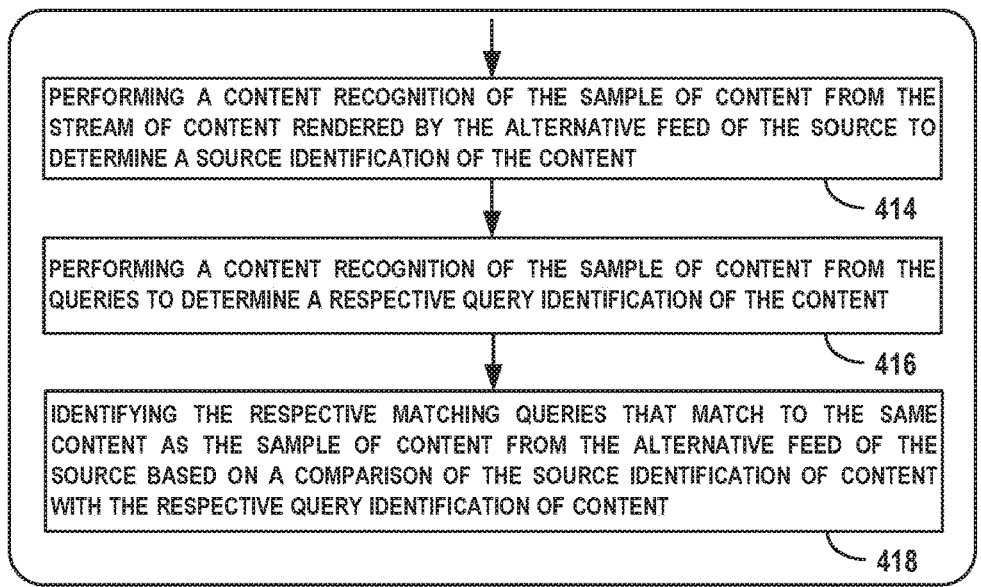
FIG. 5
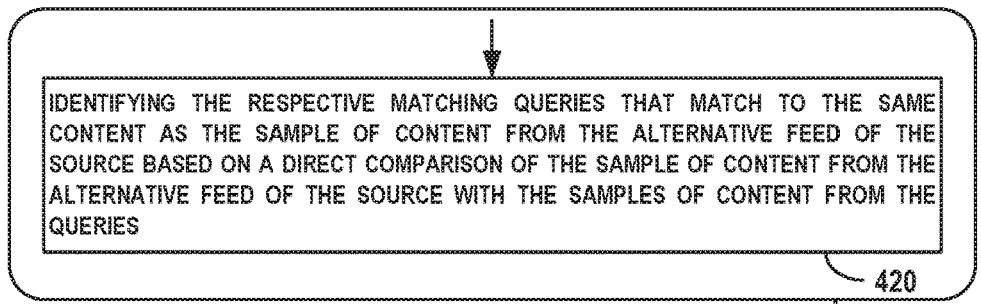
FIG. 6
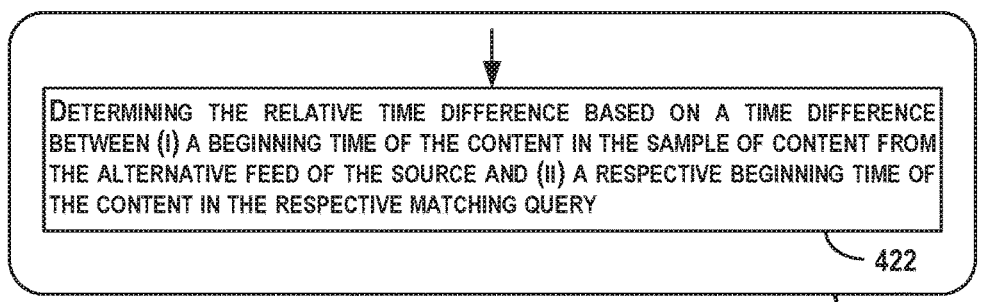
FIG. 7
DE-EMPHASIZING DATA POINTS IN THE DISTRIBUTION AS THE DATA POINTS AGE BY APPLYING AN EXPONENTIAL DECAY TO THE DISTRIBUTION — 426
FIG. 8

REMOVING ANY TIME DIFFERENCES FROM THE DISTRIBUTION OF TIME DIFFERENCES THAT ARE ABOVE A THRESHOLD DIFFERENCE

FIG. 9 — 428

ACCUMULATING THE DISTRIBUTION OF TIME DIFFERENCES OVER TIME SO AS TO SPAN A PLURALITY OF DIFFERENT PIECES OF CONTENT THAT HAVE DIFFERENT CONTENT IDENTIFICATIONS

FIG. 10 — 430

DETERMINING, IN REAL-TIME, AN IDENTIFICATION OF THE SOURCE OF THE SAMPLES OF CONTENT IN THE QUERIES

— 432

SENDING INFORMATION INDICATING THE IDENTIFICATION OF THE SOURCE TO RESPECTIVE DEVICES

FIG. 11 — 434

RECEIVING LOCATION INFORMATION FROM THE DEVICES INDICATING GEOGRAPHIC LOCATIONS OF THE DEVICES

— 436

FILTERING IDENTIFIED MATCHING QUERIES BASED ON THE GEOGRAPHIC LOCATIONS OF THE DEVICES MATCHING TO OR BEING PROXIMAL TO A GEOGRAPHIC LOCATION OF THE SOURCE

FIG. 12 — 438

DETERMINING THE LATENCY BETWEEN THE SOURCE AND THE ALTERNATIVE FEED OF THE SOURCE BASED ON A GIVEN TIME DIFFERENCE IN THE DISTRIBUTION HAVING A LARGEST ACCUMULATION

FIG. 13 — 440

METHODS AND SYSTEMS FOR DETERMINING A LATENCY BETWEEN A SOURCE AND AN ALTERNATIVE FEED OF THE SOURCE

FIELD

The present disclosure relates to content identification and source recognition, and more particularly, to determining a latency between a source rendering content and an alternative feed of the source rendering the same content.

BACKGROUND

As industries move toward multimedia rich working environments, usage of all forms of audio and visual content representations (radio broadcast transmissions, streaming video, audio canvas, visual summarization, etc.) becomes more frequent. Whether a user, content provider, or both, everybody searches for ways to optimally utilize such content. For example, one method that has much potential for creative uses is content identification. Enabling a user to identify content that the user is listening to or watching offers a content provider new possibilities for success.

As a specific example, suppose a user hears a song or piece of music broadcast over the radio that the user would like to purchase, but the user cannot identify the song. A content provider could enable a fingerprint of the song to be captured via a telephone handset and then identify the content. After recognition, the content provider could send identifying information (e.g., title, artist(s) and record label) to the user, with e-commerce options, such as to order the music or a corresponding ring tone, for example.

Furthermore, if the user could identify a broadcast source of desired content, more commerce possibilities become available to the content provider, such as advertisement and promotional plans, for example.

Existing methods for identifying the broadcast source of desired content may use watermarks embedded into an audio stream that identifies the respective station. Thus, each broadcast station would need to actively embed a watermark into the audio stream, increasing data processing complexity, and furthermore each broadcast station would need to use a watermarking technique that follows an agreed-upon standard used by a source identification system. Any station that does not follow such standards would not be identified by these means. Furthermore, a watermark signal needs to be robust enough to withstand distortion, which can occur if audio is sampled within a noisy room with reverberation or if the audio is subject to lossy compression.

Another method for identifying the broadcast source of desired content includes performing a cross-correlation analysis between an audio sample and audio feeds captured from broadcast stations (e.g., from a monitoring station). A matching station would show a strong spike in the cross correlation. However, a difficulty with cross-correlation analysis is that where a lossy compression means is employed, signals are weak and strong correlations may be difficult to achieve. In many voice codecs, phase information can be destroyed and a cross-correlation analysis would not yield a peak even if the audio sample and correct matching broadcast feed were cross-correlated, for example.

Using existing methods for broadcast source identification, it may be difficult to distinguish between sources in real-time. For instance, in the context of real-time source identification in which many highly popular songs are being played, there is a probability that two sources may have the same song playing at the same time. Alternatively, a single source may be broadcast through multiple channels (over-the-air broadcast, internet streaming, etc.) and thus, when the channels are not synchronized, source identification can be difficult.

SUMMARY

In one example, a method is described comprising receiving, by one or more processors, queries from devices, and the queries include respective samples of content from a stream of content rendered by a source. The method also includes receiving, by the one or more processors, samples of content from a stream of content rendered by an alternative feed of the source, and for each sample of content from the alternative feed of the source, identifying respective matching queries that match to the same content as the sample of content from the alternative feed of the source. The method also includes for each respective matching query, determining a respective relative time difference between a time that the content appears in the sample of content from the alternative feed and a time that the content appears in the respective matching query, accumulating a distribution of the time differences over time, and based on the distribution of time differences, determining, by the one or more processors, a latency between the source and the alternative feed of the source.

In another example, a non-transitory computer readable medium is described having stored thereon instructions, that when executed by one or more processors, cause the one or more processors to perform functions. The functions comprise receiving queries from devices, and the queries include respective samples of content from a stream of content rendered by a source. The functions also comprise receiving samples of content from a stream of content rendered by an alternative feed of the source, and for each sample of content from the alternative feed of the source, identifying respective matching queries that match to the same content as the sample of content from the alternative feed of the source. The functions also comprise for each respective matching query, determining a respective relative time difference between a time that the content appears in the sample of content from the alternative feed and a time that the content appears in the respective matching query, accumulating a distribution of the time differences over time, and based on the distribution of time differences, determining a latency between the source and the alternative feed of the source.

In another example, a system is described comprising one or more processors, and non-transitory computer readable medium storing instructions, that when executed by the one or more processors, causes the one or more processors to perform functions. The functions comprise receiving queries from devices, and the queries include respective samples of content from a stream of content rendered by a source. The functions also comprise receiving samples of content from a stream of content rendered by an alternative feed of the source, and for each sample of content from the alternative feed of the source, identifying respective matching queries that match to the same content as the sample of content from the alternative feed of the source. The functions also comprise for each respective matching query, determining a respective relative time difference between a time that the content appears in the sample of content from the alternative feed and a time that the content appears in the respective matching query, accumulating a distribution of the time differences over time, and based on the distribution of time differences, determining a latency between the source and the alternative feed of the source.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage medium, or a computer readable memory, for example.

In still another example, systems may be provided that comprise at least one processor, and data storage configured to store the instructions that when executed by the at least one processor cause the system to perform functions.

In addition, circuitry may be provided that is wired to perform logical functions of any processes or methods described herein.

In still further examples, any type of devices or systems may be used or configured to perform logical functions of any processes or methods described herein. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions.

In yet further examples, any type of devices may be used or configured to include components with means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 5 shows a flowchart of an example method that may be used with the method of FIG. 4, according to an example implementation.

FIG. 6 shows a flowchart of another example method that may be used with the method of FIG. 4, according to an example implementation.

FIG. 7 shows a flowchart of another example method that may be used with the method of FIG. 4, according to an example implementation.

FIG. 8 shows a flowchart of an example method that may be used with the method of FIG. 4, according to an example implementation.

FIG. 9 shows a flowchart of an example method that may be used with the method of FIG. 4, according to an example implementation.

FIG. 10 shows a flowchart of an example method that may be used with the method of FIG. 4, according to an example implementation.

FIG. 11 shows a flowchart of an example method that may be used with the method of FIG. 4, according to an example implementation.

FIG. 12 shows a flowchart of an example method that may be used with the method of FIG. 4, according to an example implementation.

FIG. 13 shows a flowchart of an example method that may be used with the method of FIG. 4, according to an example implementation.

DETAILED DESCRIPTION

Figure 1:
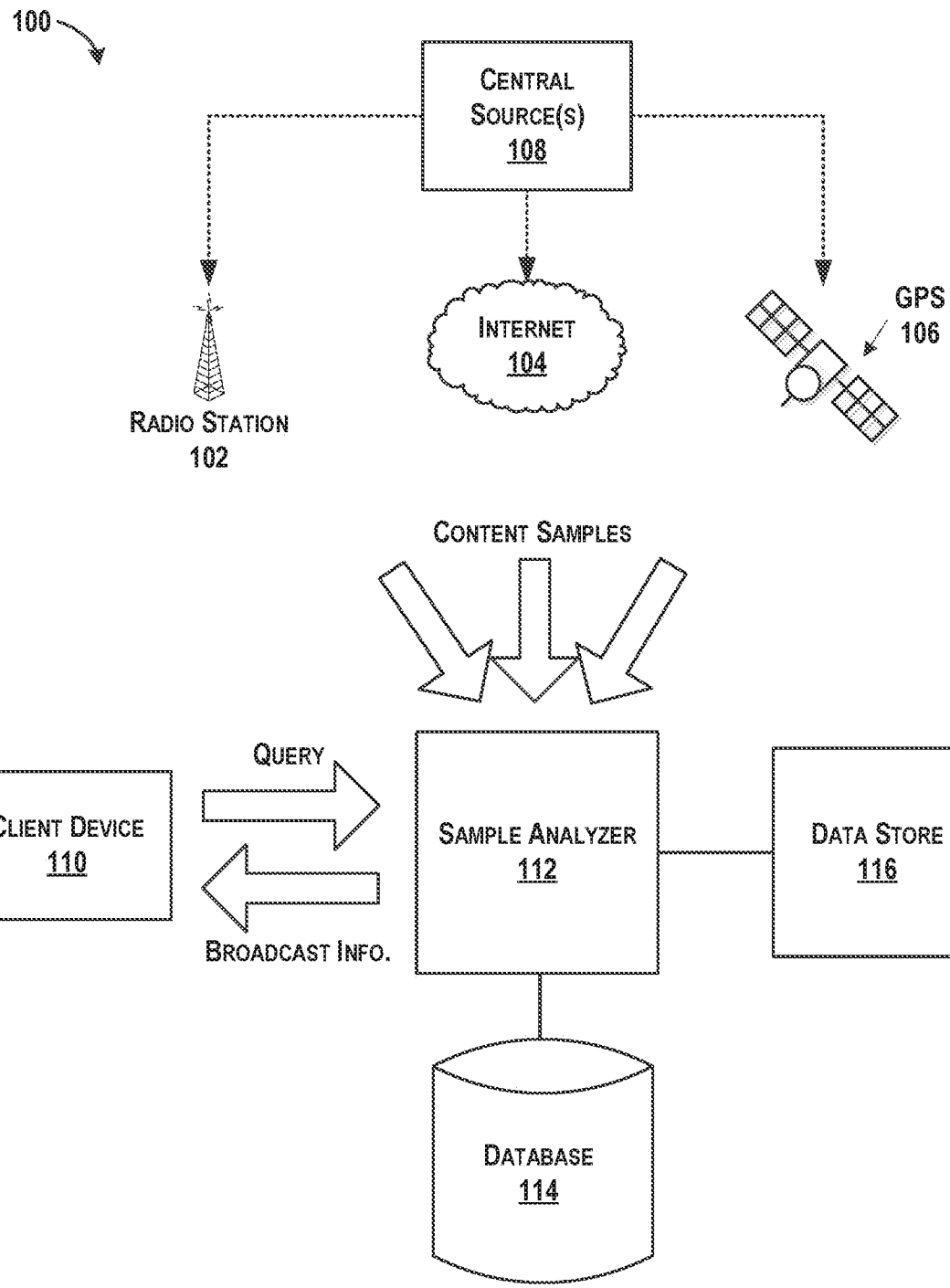
FIG. 1 illustrates one example of a system for identifying a broadcast source of desired content, as well as identifying a latency between sources that render the same content, according to an example implementation.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

In the field of content identification, it may be desirable to identify not only content, but also a source (e.g., channel, stream, or station) of a broadcast transmission. For example, it may be desirable to detect from a free-field content sample of a radio broadcast which radio station a user is listening to, as well as to what song the user is listening.

Example described embodiments illustrate methods and systems for determining the source, and for determining a latency between two sources of broadcast content. As an example, the methods may determine a latency of a streaming internet feed versus an over-the-air (OTA) transmission or broadcast transmission of a radio signal corresponding to the internet feed. This may be useful in many instances, for example, it may be more convenient to monitor certain types of feeds, and compare monitored feeds to samples received from client devices so as to determine a source of a broadcast transmission of the samples. Certain types of feeds for monitoring may include streaming internet feeds from a radio station, which may be more convenient to monitor than to mount radio listening posts all around the country, however, the internet feeds coming over networks may have a random or fixed latency or time offset as compared to the broadcast transmission, and possibly with slow drift (e.g., the stream may lead or lag the over-the-air transmission by up to five or seconds). Thus, the latency (when known) can be useful for content and source identification purposes when the internet feed is the type of feed being monitored and used during the recognition processing.

In addition, in the context of real-time source identification of samples in which many highly popular songs are being played, there may be a significant probability that two stations have the same song or content playing at the same time. Not knowing the latency of an unknown source compared to a monitored source can make it difficult to determine a true station identity of a sample in a query with high probability. Accurate timestamps of the broadcast and timestamps from a client submitting the samples can help reduce misidentification of a radio station. But, if the time offset of the source from which the sample is taken is not known, then it may be difficult to confirm a particular identification of a song playing on a radio station.

Within examples described below, potential matches of content in samples from client devices against content in any given monitored station hitting against the same content can be flagged. If identified content in a client sample and in a monitored broadcast match, then a time difference between a beginning time of the content from the monitored broadcast stream feed timestamp and a beginning time of the content of the client sample is calculated. If the difference is within a predetermined tolerance, e.g., lead or lag between about 60-100 seconds, then that difference is noted into a bucket corresponding to the monitored broadcast stream feed. A histogram of the time differences in the bucket compiled over a period of time will yield a peak corresponding to the true offset or latency of the monitored alternative feed of the broadcast stream to the broadcast stream. This is because spurious potential hits will have random time offsets, but the true hits resulting from queries against the monitored broadcast feed will accumulate in the histogram around the true offset, thus creating a peak. The histogram may be accumulated over a span of many minutes, spanning significantly many different pieces of content, for example.

Two different broadcast stations are highly unlikely to play the exact content at the same time over an extended period of time, e.g. hours. Thus, during a span of time where two copies of a song are coincidentally playing on two different channels, a histogram peak of time differences may accumulate from queries of that song over the buckets for the two stations. Such accumulation on the wrong channel may be a non-persistent condition and over time that spurious peak in the histogram will fade relative to any correct peak. Optionally, the histogram may be over a time window or be made to decay slowly (e.g., such as an exponential decay over time), thus de-emphasizing older data points. Accumulation on the correct channel will create a histogram peak that persists stably over the long term. Another aspect includes that the offset derived from the histogram peak will track the true offset even when the latter drifts slowly over time.

Within examples, to further disambiguate potential matches against a given channel's bucket, it may be known that the broadcast transmitter is located in a certain geographical area. Many client devices may also provide location information (e.g., GPS). Such information may be used to filter potential matches going into the channel buckets, thus restricting spurious matches to stations located near each other, e.g., within reception range of a given geo-located client device.

Referring now to the figures, FIG. 1 illustrates one example of a system 100 for identifying a broadcast source of desired content, as well as identifying a latency between sources that render the same content, according to an example implementation. The system 100 includes sources of content (e.g., radio, television, internet or other network content provider), such as a radio station 102, the internet 104, and a satellite source 106, any of which may be coupled to a central source 108 or feed. The system 100 also includes a client device 110, which a user utilizes to record a sample of content broadcast or transmitted by any of the sources, and to send the sample to a sample analyzer 112 via a wireless or wired means. As such, the client device 110 may be a mobile cellular telephone, a PDA, computer, or any device with processing means, and may record the sample of content using a microphone so as to record a sample of an ambient environment of the client device 110. The client device 110 may communicate with the sample analyzer 112 using wireless or wired communications, and through any number of networks.

Using the sample, the sample analyzer 112 can identify information pertaining to the broadcast sources and about the content of the sample, such as by accessing a database 114 containing audio or video sample and broadcast information, for example. The information may include content identification (e.g., name of song, artist, etc.) and/or broadcast identification (e.g., name of radio station, etc.). The information may then be reported to the user by sending the information to the client device 110. Additional information may also be sent with the broadcast information, such as promotional advertisements, discount offers, and other information specific for a certain broadcaster, for example. The broadcast information may also be reported to a data store 116, which may be a consumer tracking agency, or other statistical center, for example.

The sample analyzer 112 also receives samples from the sources to monitor the sources. The sample analyzer 112 may monitor each source, or the sample analyzer 112 may monitor only some sources. In some examples, it may be more convenient to monitor sources from the internet 104, such as to monitor an internet radio feed of a radio station. In this manner, separate monitoring stations are not required to be positioned throughout geographic areas to monitor large numbers of radio stations that transmit locally, but rather, the sample analyzer 112 can receive the alternative feed of those radio stations by accessing the internet feeds.

In some examples, the sample analyzer 112 may determine a broadcast source of content in the sample received from the client device 110 by comparison to any monitored feed from a monitored source. Within examples herein, the sample analyzer 112 is described as monitoring an alternative internet feed of a radio station to gain information of the radio station. However, the sample analyzer 112 may additionally or alternatively monitor any of the sources as an alternative feed of other corresponding sources.

Figure 2:
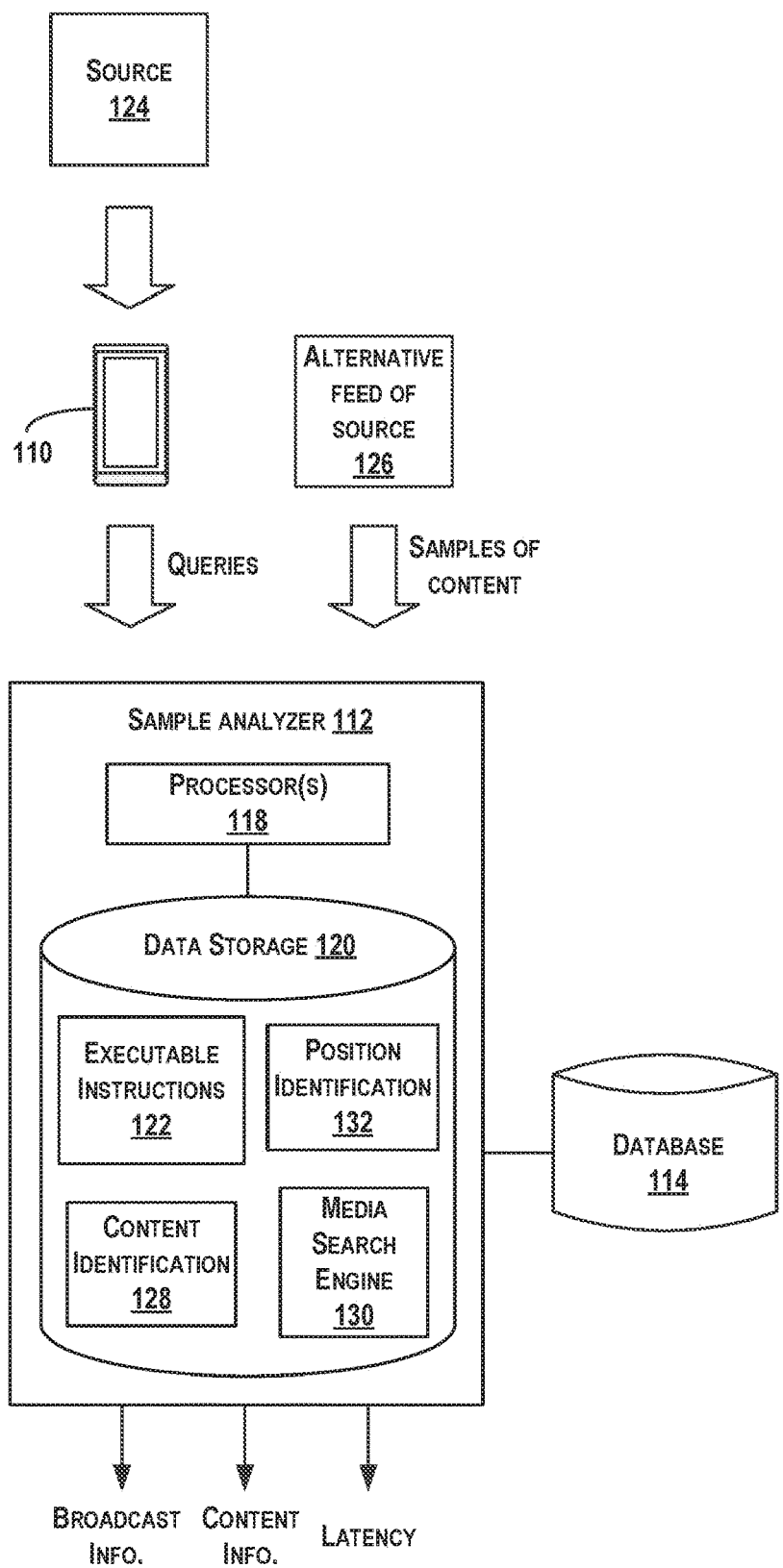
FIG. 2 is a block diagram illustrating example components of the sample analyzer, according to an example implementation.

FIG. 2 is a block diagram illustrating example components of the sample analyzer 112, according to an example implementation. The sample analyzer 112 includes a processor(s) 118 (one or more processors) and data storage 120 storing executable instructions 122, that when executed by the processor(s) 118, causes the processor(s) 118 to perform functions as described herein. The sample analyzer 112 may also include hardware to enable communication within the sample analyzer 112 and between the sample analyzer 112 and other devices. The hardware may include transmitters, receivers, and antennas, for example, and may enable a wireless interface and/or one or more wireline interfaces that allow for both short-range communication and long-range communication to one or more networks or to one or more remote devices. Such wireless interfaces may provide for communication under one or more wireless communication protocols, such as Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include Ethernet interface, a Universal Serial Bus (USB) interface, or similar interface to communicate via a wire, a twisted pair of wires, a coaxial cable, an optical link, a fiber-optic link, or other physical connection to a wireline network.

The processor(s) 118 may be a general-purpose processor or a special purpose processor (e.g., digital signal processors, application specific integrated circuits, etc.). The processor(s) 118 may receive inputs, and process the inputs according to the executable instructions 122 stored in the data storage 120 to generate outputs that can also be stored in the data storage 120 and/or output through a communication interface. The processor(s) 118 can be configured to execute the executable instructions 122 (e.g., computer-readable program instructions) that are stored in the data storage 120 and are executable to provide functionality of the sample analyzer 112 described herein.

The data storage 120 may include or take the form of one or more computer-readable storage media that can be read or accessed by the processor(s) 118. The computer-readable storage media can include volatile and/or non-volatile storage components, such as optical, magnetic, organic or other memory or disc storage, which can be integrated in whole or in part with the processor(s) 118. The data storage 120 is considered non-transitory computer readable media. In some examples, the data storage 120 can be implemented using a single physical device (e.g., one optical, magnetic, organic or other memory or disc storage unit), while in other examples, the data storage 120 can be implemented using two or more physical devices.

The data storage 120 thus is a non-transitory computer readable storage medium, and executable instructions 122 are stored thereon. The instructions 122 include computer executable code. When the instructions 122 are executed by the processor(s) 118, the processor(s) 118 are caused to perform functions. Such functions include receiving queries from devices, receiving samples of content from a stream of content rendered by an alternative feed of the source, identifying respective matching queries that match to the same content as the sample of content from the alternative feed of the source, for each respective matching query determining a respective relative time difference between a time that the content appears in the sample of content from the alternative feed and a time that the content appears in the respective matching query, accumulating a distribution of the time differences over time; and based on the distribution of time differences, and determining a latency between the source and the alternative feed of the source, as described more fully below.

In an example operation, the sample analyzer 112 receives queries from client devices, such as client device 110, that includes samples of content from a source of content. Although only one client device is shown, the sample analyzer 112 may receive samples from numerous devices. The sample analyzer 112 also receives samples of content from an alternative feed 126 of the source 124. The source 124 can be any of broadcast antennas, interne streaming feeds, satellite radio stations, etc., and the alternative feed 126 of the source 124 is a corresponding feed to that same source, but using a different transmission technique. For example, the source 124 may be a radio station, and the alternative feed 126 of the source 124 may be an interne streaming feed of that radio station.

Following, the sample analyzer 112 determines matching queries that match to the same content as the sample of content from the alternative feed 126 of the source 124, and for each respective matching query, determines a respective relative time difference between a time that content, which matches to the respective matching query, appears in the sample of content from the alternative feed 126 to the timestamp of the content in the respective matching query. In one example, the relative time difference can be determined as a time difference between (i) a beginning time of the content in the sample of content from the alternative feed 126 of the source 124 and (ii) a respective beginning time of the content in the respective matching query. In an example where the content is a song, the beginning time refers to a time at which the song started playing.

In another example, a timestamp can be included in the query that includes a UTC time (coordinated universal time) at which the content in the query was started to be recorded. The sample, of content from the alternative feed 126 of the source 124 also has an associated UTC time, which operates as a reference time point. Then, a time at which matching content appears in the stream from the alternative feed 126 will be offset from the UTC feed time by some $\Delta T_{content}$. The relative time difference can then be determined by subtracting the UTC feed time and the $\Delta T_{content}$ from the UTC query timestamp.

The sample analyzer 112 can then accumulate a distribution of the time differences over time, and determining a latency between the source 124 and the alternative feed 126 of the source 124 rendering the same content based on the distribution of time differences. The sample analyzer 112 may thus output the latency data, as well as broadcast information and content information, as described more fully below.

The sample analyzer 112 may receive the samples of content from the client device 110 and from the alternative feed 126 of the source 124 through various wired or wireless means, and although only one alternative feed is shown, the sample analyzer 112 may monitor numerous alternative feeds of numerous sources. As an example, the sample analyzer 112 may have a monitor for each source, such as for example, for a broadcast source, a monitor may include a radio antenna positioned in the field and connected by wired communications or through other wireless repeaters to the sample analyzer 112. For an interne feed, the monitor may include a communication bus or server that couples the sample analyzer 112 to an interne feed. For a satellite radio broadcast, the monitor may include a satellite antenna for reception of the broadcast transmissions. For the client device 110, the sample analyzer 112 may receive the queries through an antenna or server feed, for example.

The sample analyzer 112 may be configured to perform position and/or content identifications of samples of content. For example, the data storage 120 includes executable instructions for performing a content identification 128 of a sample of content. The content identification 128 functions can include referencing a media search engine 130 to search the database 114 of indexed recordings, for example, to compare the sample of content with the stored information so as identify an indexed recording to which the sample of ambient content matches. The database 114 may store indexed recordings that include information to identify samples of content. The indexed recordings may include media recordings such as music, advertisements, jingles, movies, documentaries, television and radio programs. Each recording may be identified by a unique identifier (e.g., sound_ID or program_ID). Alternatively, the database 114 may not necessarily store audio or video files for each indexed recording, since the IDs can be used to retrieve files from elsewhere. The database 114 may yet additionally or alternatively store representations for multiple indexed recordings as a single data file where all indexed recordings are concatenated end to end to conceptually form a single media content recording, for example. The database 114 may include other information (in addition to or rather than media recordings), such as reference signature files including a temporally mapped collection of features describing content of an indexed recording that has a temporal dimension corresponding to a timeline of the indexed recording, and each feature may be a description of the content in a vicinity of each mapped timepoint.

The database 114 may also include or store information for each indexed recording. For example, metadata may be stored with each indexed recording that indicates information about the recording, such a length of the recording, a date and time of the recording, a location (e.g., geographic coordinates, or descriptive location like a coffee shop) at which the recording was captured, a name of the recording, or any other identifying or related information to the recording.

The data storage 120 further includes executable instructions for performing a position identification 132 of a sample of content. A position identification indicates an offset into the indexed recording at which the sample of content was taken, for example. For example, the offset indicates a time position ($T_S$) of the sample into the indexed recording. The time position ($T_S$) may also, in some examples, be an elapsed amount of time from a beginning of the indexed recording. For example, the indexed recording may be a television show, and the time position ($T_S$) may correspond to an elapsed amount of time of the show at which the computing device 110 captured the sample of ambient content.

In an example operation, the client device 110 may capture a sample of ambient content of the client device 110. The client device 110 may send the sample of ambient content over a network to the sample analyzer 112 to determine a position identification of the sample of ambient content into an indexed recording to which the sample of ambient content matches. The sample of ambient content can be sent within a gum by the client device 110. In response to the query received from the client device 110, the sample analyzer 112 identifies the position identification and returns information of the position identification to the client device 110.

Generally, the client device 110 and/or the sample analyzer 112 may perform functions including a content identification to determine an identity of content in the sample itself or a position identification of the sample of ambient content. In other examples, functionality of the content and position identification may performed by the client device 110 fully, which records the sample of ambient content, and determines the content and/or position identification of the sample of ambient content into the indexed recording to which the sample of ambient content matches. In this regard, the client device 110 can include a database for storing indexed recordings. The client device 110 may then send information of the identified content (including the content and/or position identification) to the sample analyzer.

Many example techniques may be used to perform the content identification and position identification of the sample of ambient content. For example, for media or audio content identification (e.g., music and television), various content identification methods are known for performing computational content identifications of media samples and features of media samples using a database of known media. The following U.S. Patents and publications describe possible examples for media recognition techniques, and each is entirely incorporated herein by reference, as if fully set forth in this description: Kenyon et al, U.S. Pat. No. 4,843,562; Kenyon, U.S. Pat. No. 4,450,531; Haitsma et al, U.S. Patent Application Publication No. 2008/0263360; Wang and Culbert, U.S. Pat. No. 7,627,477; Wang, Avery, U.S. Patent Application Publication No. 2007/0143777; Wang and Smith, U.S. Pat. No. 6,990,453; Blum, et al, U.S. Pat. No. 5,918,223; Master, et al, U.S. Patent Application Publication No. 2010/0145708.

As one example of content and position identification functions, fingerprints of a received sample of content can be matched to fingerprints of an indexed recording by generating correspondences between equivalent fingerprints to locate an indexed recording that has a largest number of linearly related correspondences, or whose relative locations of characteristic fingerprints most closely match the relative locations of the same fingerprints of the indexed recording.

Each fingerprint occurs at a given time, so after matching fingerprints between an indexed recording and the sample, a difference in time between a first fingerprint (of the matching fingerprint in the sample) and a first fingerprint of the indexed media recording will be a time offset of the sample, e.g., amount of time into the indexed recording. In some examples, a sound or program identifier of the matching indexed recording can then be identified to determine an identity of the sample of content and an offset of the sample of content into the identified indexed recording.

Figure 3:
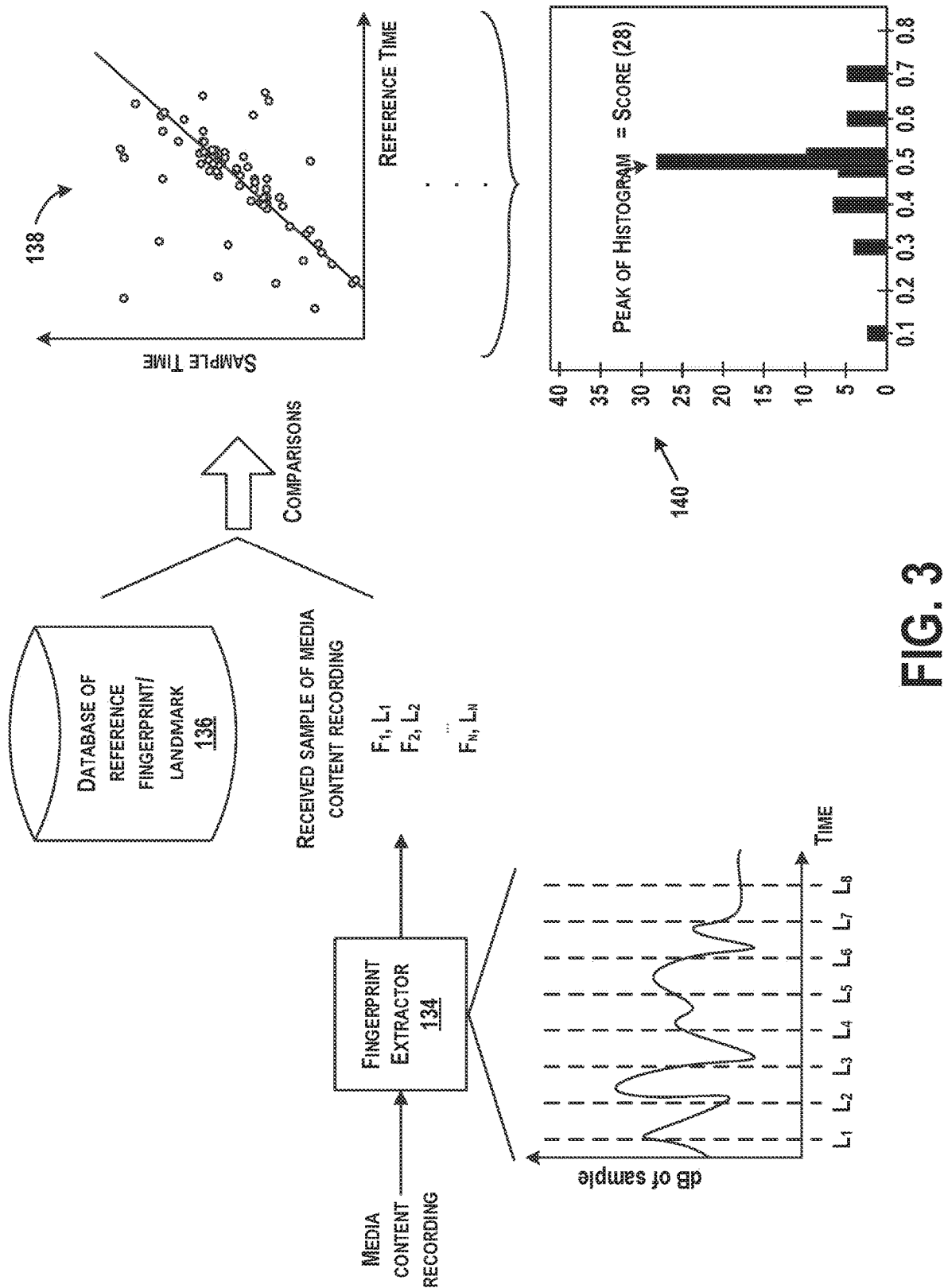
FIG. 3 illustrates an example diagram for performing a content and/or position identification of a sample of content, according to an example implementation.

FIG. 3 illustrates an example diagram for performing a content and/or position identification of a sample of content, according to an example implementation. Functions shown and described with respect to FIG. 3 may be implemented by the client device 110 and/or by the sample analyzer 112. Thus, components shown in FIG. 3 may be included within the client device 110 and/or the sample analyzer 112. In addition, components shown in FIG. 3 may be, implemented with a processor executing instructions to perform functions described.

Initially, the sample of content is input to a fingerprint extractor 134 that computes characteristics or fingerprints of the media recordings. An example plot of dB (magnitude) of a sample vs. time is shown, and the plot illustrates a number of identified landmark positions ($L_1$ to $L_8$) in the sample.

Particular locations within the sample at which fingerprints are computed may depend on reproducible points in the sample. Such reproducibly computable locations are referred to as "landmarks." One landmarking technique, known as Power Norm, is to calculate an instantaneous power at many time points in the recording and to select local maxima. One way of doing this is to calculate an envelope by rectifying and filtering a waveform directly. Another way is to calculate a Hilbert transform (quadrature) of a signal and use a sum of magnitudes squared of the Hilbert transform and the original signal. Other methods for calculating landmarks may also be used.

Once the landmarks have been determined, a fingerprint is computed at or near each landmark time point in the recording. The fingerprint is generally a value or set of values that summarizes a feature or a set of features in the recording at or near the landmark time point. In one example, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks. In one example, to generate spectral slice fingerprints, a frequency analysis is performed in the neighborhood of each landmark timepoint to extract the top several spectral peaks. A fingerprint value may then be the single frequency value of a strongest spectral peak. For more information on calculating characteristics or fingerprints of audio samples, the reader is referred to U.S. Pat. No. 6,990,453, the entire disclosure of which is herein incorporated by reference as if fully set forth in this description.

The fingerprint extractor 134 may generate a set of fingerprints each with a corresponding landmark and provide the fingerprint/landmark pairs for the sample of content to data storage of the client device 110 and/or the sample analyzer 112, respectively. For example, fingerprint and landmark pairs ($F_1/L_1, F_2/L_2, \ldots, F_n/L_n$) can be determined for the sample of content. The fingerprints and landmark pairs may be represented in the data storage as key-value pairs where the key is the fingerprint and the value is a corresponding landmark.

After indexing the sample of content, the client device 110 and/or the sample analyzer 112 then uses the indexed sample to compare against indexed recordings stored in a database (e.g., database 114) to identify which of the indexed recordings has any matching portions to any of the indexed samples. The indexed recordings may be indexed in the same manner in which fingerprint and, landmark pairs of a recording are generated and stored with a unique identifier (e.g., sound_ID or program_ID).

Thus, the client device 110 and/or the sample analyzer 112 compares the fingerprint and landmark pairs of the sample to the fingerprint and landmark pairs of the indexed recordings to identify matches. To identify matches, fingerprints of a sample can be matched to fingerprints of indexed recordings by generating correspondences between equivalent fingerprints (or substantially equivalent fingerprints) to locate an indexed recording that has a number of linearly related correspondences to the sample, or whose relative locations of characteristic fingerprints most closely match the relative locations of the same fingerprints of the sample.

Referring to FIG. 3, a scatter plot 138 of landmarks of the sample and an indexed recording at which fingerprints match (or substantially match) is illustrated, according to an example implementation. After generating the scatter plot 138, linear correspondences between the landmark pairs can be identified, and sets can be scored according to the number of pairs that are linearly related. A linear correspondence may occur when a statistically significant number of corresponding sample locations and indexed recording locations can be described with substantially the same linear equation, within an allowed tolerance, for example.

In one example, a histogram 140 of offset values of matching fingerprint/landmark pairs of the sample to the indexed recordings can be generated. The offset values may be differences in landmark time positions between the sample and the indexed recording where a fingerprint matches. Thus, the offset indicates a position into the indexed recording where the sample matches. FIG. 3 illustrates an example histogram 140 of offset values. The offset value having a peak of the histogram (e.g., score=28 in FIG. 3) is a winning time offset, indicating the time offset to use for the matched sample. Each sample can be processed in this manner to perform a position identification and to generate a time offset.

Other forms of media sample comparison may also be performed depending on a type of the sample. For example, a video identification algorithm may be used to identify a position within a video stream (e.g., a movie). An example video identification algorithm is described in Oostveen, J., et al., "Feature Extraction and a Database Strategy for Video Fingerprinting", Lecture Notes in Computer Science, 2314, (Mar. 11, 2002), 117-128, the entire contents of which are herein incorporated by reference as if fully set forth herein. For example, a position of a video sample into a video recording can be derived by determining which video frame was identified. To identify the video frame, frames of the media sample can be divided into a grid of rows and columns, and for each block of the grid, a mean of the luminance values of pixels is computed. A spatial filter can be applied to the computed mean luminance values to derive fingerprint bits for each block of the grid. The fingerprint bits can be used to uniquely identify the frame, and can be compared or matched to fingerprint bits of a database that includes known media. The extracted fingerprint bits from a frame may be referred to as sub-fingerprints, and a fingerprint block is a fixed number of sub-fingerprints from consecutive frames. Using the sub-fingerprints and fingerprint blocks, identification of video samples can be performed. Based on which frame the media sample included, a position into the video (e.g., time offset) can be determined.

Furthermore, other forms of content and/or position identification and matching may also be performed, such as using watermarking methods. A watermarking method can be used to determine a time offset in instances in which the indexed recordings and associated samples may have embedded watermarks at intervals, and each watermark specifies a, time or position of the watermark either directly, or indirectly via a database lookup, for example. If the indexed recording includes embedded watermarks that indicate, either directly or indirectly, a time or position offset value, the sample analyzer 112 may determine the time offset of a sample into the indexed recordings.

Referring back to FIG. 2, the sample analyzer 112 may also determine a source of a sample of content. Broadcast or source identification may be performed using relative time comparison. Initially, in the field, a user may collect a sample with the client device 110 that will further time stamp the sample in terms of a "real-time" offset from a common time base. As described with respect to FIG. 3, characteristics of the sample and an estimated time offset of the sample within the "original" recording are determined (e.g., to determine the point in a song when the sample was recorded). At the same time, samples from broadcast channels being monitored by the sample analyzer 112 can be recorded and also time stamped in terms of a "real-time" offset from a common time base. Characteristics and an estimated time offset of the broadcast sample within the "original" recording are determined (e.g., to determine the point in a song when the sample was recorded). Then the user sample characteristics are compared with characteristics from broadcast samples that were taken at or near the time the user sample was recorded. The user sample time stamp is used to identify broadcast samples for comparison. Further, the time offset of the user sample is compared to the time offset of the broadcast sample to identify a match. If the real-time offsets are within a certain tolerance, e.g., one second, then the user sample is considered to be originating from the same source as the broadcast sample, since the probability that a random performance of the same audio content (such as a hit song) is synchronized to less than one second in time is low.

Broadcast or source identification may also be performed using comparisons of time-stamped identities. Initially, a user sample collected by the user is identified using a content identification (e.g., identifying an audio sample out of a database of audio content files). While the user audio sample is collected, a user sample timestamp. (UST) is taken to mark the beginning time of the audio sample based on a standard reference clock. Using the identification produces an accurate relative time offset between a beginning of the identified content file from the database and a beginning of the audio sample being analyzed, e.g., a user may record a ten second sample of a song that was 67 seconds into a song. Hence, a user sample relative time offset (USRTO) and a user sample identity are noted as a result of identifying the user audio sample. At the same time, broadcast audio samples are taken periodically from each of at least one broadcast channel being monitored by the sample analyzer 112; and similarly, a content identification step is performed for each broadcast channel. The broadcast samples should be taken frequently enough so that at least one sample is taken per audio program (i.e., per song) in each broadcast channel. For example, if the monitoring station records 10 second samples, after a content identification, the monitoring station would know the length of the song, and also how much longer before the song is over. The monitoring station could thus calculate the next time to sample a broadcast channel based on the remaining length of time of the song, for example. For each broadcast sample, a broadcast sample timestamp (BST) is also taken to mark the beginning of each sample based on the standard reference clock. Further, a relative time offset between the beginning of the identified content file from the database and the beginning of the broadcast sample being analyzed is computed. Hence, a broadcast sample relative time offset (BSRTO) and a broadcast sample identity is noted as a result of identifying each broadcast audio sample. To identify a broadcast source, the user sample and broadcast samples are compared to first identify matching sample identities, and then to identify matching "relative times". If a match is found, the corresponding broadcast information is reported back to the user. Thus, matching the sample identities ensures that the same song, for example, is being compared. Then, matching the relative times translates the samples into equivalent time frames, and enables an exact match to be made. Thus, the sample analyzer 112 may determine broadcast information and content information of samples received from the client device 110.

For more information on example techniques for determining information of a broadcast source, the reader is referred to U.S. Pat. No. 8,290,423, the entire contents of which are herein incorporated by reference, as if fully set forth in this description Within described examples, client devices send in queries having samples of content from a broadcast and the sample analyzer 112 monitors content being transmitted from an alternative feed of the broadcast (e.g., a copy of the broadcast which is same channel except usually with a time delay). For instance, it may be more convenient to monitor certain types of feeds (e.g., such as internet streaming media vs. broadcast transmissions that may require installation of monitors throughout geographic areas), and compare monitored feeds to samples received from client devices so as to determine a source of a broadcast transmission of the samples. And, certain types of feed for monitoring may include streaming internet feeds from a radio station, which may be more convenient to monitor than to mount radio listening posts all around the country, however, the internet feeds coming over networks may have a random or fixed time offset, possibly with slow drift (e.g., the stream may lead or lag the over-the-air transmission by up to five or seconds). Thus, the method 400 may be performed to determine this time offset, which can be useful in the context of real-time source identification. The time offsets are thus associated with latency, in some examples, of content broadcast by one source vs. another. Thus, examples herein enable determination of the delay between a broadcast source and a copy or alternative feed of the broadcast source.

Figure 4:
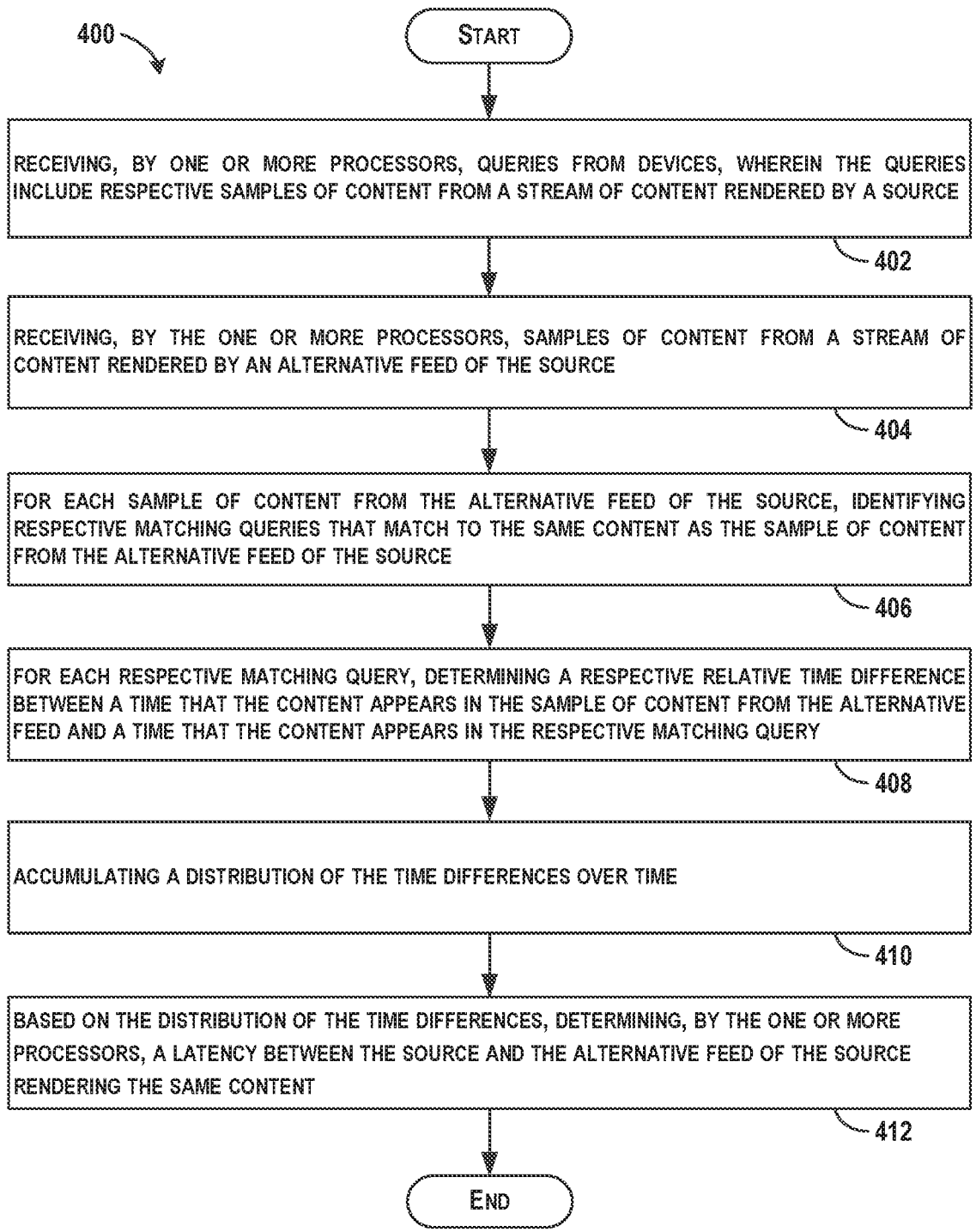
FIG. 4 shows a flowchart of an example method for determining a latency between a source and an alternative feed of the source rendering the same content, according to an example implementation.

FIG. 4 shows a flowchart of an example method 400 for determining a latency between a source and an alternative feed of the source rendering the same content, according to an example implementation. Method 400 shown in FIG. 4 presents an embodiment of a method that, for example, could be used with the system shown in FIGS. 1-2, for example, and may be performed by a client device (or components of a computing device) or a server/sample analyzer or may be performed by components of both a client device and a server. Method 400 may include one or more operations, functions, or actions as illustrated by one or more of blocks 402-412. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block in FIG. 4 may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 402, the method 400 includes receiving, by one or more processors 118, queries from devices (e.g., device 110), and the queries include respective samples of content from a stream of content rendered by the source 124. A given query may include a sample of content, and in some examples, a corresponding device timestamp. The associated timestamp indicates a UTC time (i.e., coordinated universal time) at which the sample of content was recorded, or a start time of the recording.

At block 404, the method 400 includes receiving, by the one or more processors 118, samples of content from a stream of content rendered by the alternative feed 126 of the source 124. Within examples, the source 124 includes a radio broadcast, and the alternative feed 126 of the source 124 includes one or more of a streaming internet feed and a streaming satellite feed corresponding to the radio broadcast. The samples of content may have corresponding sample timestamps.

At block 406, the method 400 includes for each sample of content from the alternative feed of the source, identifying respective matching queries that match to the same content as the sample of content from the alternative feed of the source. Matching queries may be determined using a number of methods, and generally a comparison of the sample from the alternative feed of the source to the samples in the queries is performed.

FIG. 5 shows a flowchart of an example method that may be used with the method 400 of FIG. 4, according to an example implementation. As shown at blocks 414-418, additional functions can include performing a content recognition of the sample of content from the stream of content rendered by the alternative feed 126 of the source 124 to determine a source identification of the content, performing a content recognition of the sample of content from the queries to determine a respective query identification of the content, and identifying the respective matching queries that match to the same content as the sample of content from the alternative feed 126 of the source 124 based on a comparison of the source identification of content with the respective query identification of content. In this example, content identifications are performed for the queries and the monitored alternative feeds, and when the content identifications match, the matching query is identified.

FIG. 6 shows a flowchart of another example method that may be used with the method 400 of FIG. 4, according to an example implementation. As shown at block 420, additional functions can include identifying the respective matching queries that match to the same content as the sample of content from the alternative feed 126 of the source 124 based on a direct comparison of the sample of content from the alternative feed 126 of the source 124 with the samples of content from the queries. In this example, a one-to-one comparison of the samples to each other can be performed.

Referring back to FIG. 4, at block 408, the method 400 includes for each respective matching query, determining a respective relative time difference between a time that the content appears in the sample of content from the alternative feed 126 and a time that the content appears in the respective matching query. In one example, determining the relative time difference includes determining the time difference between (i) a beginning time of the content in the sample of content from the alternative feed of the source and (ii) a respective beginning time (e.g., timestamp) of the content in the respective matching query. The time difference can be determined by subtracting the beginning time of the content in the sample of content from the alternative feed of the source from the beginning time or timestamp of the content in the respective matching query and taking the absolute value of the difference.

The beginning time of content can be determined based on the position identification that provides the time offset into the content from which the sample was taken. Once the time offset is known, the beginning time can be determined.

When included in the query, the timestamp can include the UTC time at which the content was started to be recorded, and the alternative feeds also have associated UTC starting times that reference a starting time for streaming content, which can be any time point used for a reference. Then, a time at which content appears in the stream from the alternative feed that matches to the content in the query is offset from the feed UTC time point by a $\Delta T_{content}$. Then, in some examples, a relative time difference can be found by the following equation:

$$UTC_{query} - (UTC_{feed} + \Delta T_{content})$$

where $UTC_{query}$ is the timestamp of the query, $UTC_{feed}$ is the UTC reference time of the alternative feed, and $\Delta T_{content}$ is an amount of time after the $UTC_{feed}$ at which the content appears that matches to content in the query.

FIG. 7 shows a flowchart of another example method that may be used with the method 400 of FIG. 4, according to an example implementation. As shown at block 422, additional functions can include determining the relative time difference based on a time difference between (i) a beginning time of the content in the sample of content from the alternative feed of the source and (ii) a respective beginning time of the content in the respective matching query. Further functions can then include comparing the sample of content from the alternative feed 126 of the source 124 with indexed recordings of content in a database, and the indexed recordings have beginning times and end times, and then determining the beginning time of the content in the sample of content from the alternative feed 126 of the source 124 based on a match to one of the indexed recordings of content in the database. Thus, in this example, the content identification also provides another way to determine the beginning time of the content.

Referring back to FIG. 4, at block 410, the method 400 includes accumulating a distribution of the time differences over time. In one example, this includes generating a histogram of the time differences, or generating a log of the time differences so as to identify which time difference is most commonly observed.

At block 412, the method 400 includes based on the distribution of time differences, determining, by the one or more processors, a latency between the source 124 and the alternative feed 126 of the source 124 rendering the same content. In some examples, the latency is determined based on a peak of the histogram such that the latency is taken to be an amount equal to a time difference for the peak of the histogram. In further examples, data points in the histogram can be de-emphasized as the data points age, and a peak of the histogram can be tracked over time to determine the latency. In addition, the time differences may drift over time as well, and the histogram peaks will change as a result. Thus, the histogram may be considered a time window histogram, and data points can be removed as the data points age (e.g., as the data points exist longer than a day, the data points are removed).

FIG. 8 shows a flowchart of an example method that may be used with the method 400 of FIG. 4, according to an example implementation. As shown at block 426, additional functions can include de-emphasizing data points in the distribution as the data points age by applying a decay to the distribution.

FIG. 9 shows a flowchart of an example method that may be used with the method 400 of FIG. 4, according to an example implementation. As shown at block 428, additional functions can include removing any time differences from the distribution of time differences that are above a threshold difference. For example, it a time difference is leading or lagging between about 60-100 seconds, then that difference is noted, and differences above 2 minutes may be discarded. The threshold difference can be set to be higher or lower, such as up to 4 minutes, or down to 20 seconds, depending on the types of broadcasts being monitored and the amounts of delay observed over time for alternative feeds of those broadcasts.

FIG. 10 shows a flowchart of an example method that may be used with the method 400 of FIG. 4, according to an example implementation. As shown at block 430, additional functions can include accumulating the distribution of time differences over time so as to span a plurality of different pieces of content that have different content identifications. In this example, once a number of pieces of content have been monitored, it can be determined to a higher level of accuracy that the correct alternative feed is being match to the correct source, for example. For example, in the field of song identification, accumulation of time differences may occur, for example, over a span of 30 minutes, so as to note time differences over 5-7 different songs. Any time span can be used for accumulation of data, and a longer accumulation may result in a time difference determination of a higher probability.

FIG. 11 shows a flowchart of an example method that may be used with the method 400 of FIG. 4, according to an example implementation. As shown at blocks 432-434, additional functions can include determining, in real-time, an identification of the source 124 of the samples of content in the queries, and sending information indicating the identification of the source 124 to respective devices. The broadcast source identification can be determined using one of the methods described above either by direct comparison of samples (e.g., sample from device and sample from monitored source), or by comparison of content identifications (e.g., content identification of sample from device and content identification of sample from monitored source). In further examples, the samples of content include associated timestamps indicating a start time at which the sample was recorded, and the associated timestamps are compared with an alternative feed source time adjusted by the latency to determine, and based on the associated timestamps and the alternative feed source time being within a time window, it is determined that the samples of content were recorded from an original feed of a source corresponding to the source of the alternative feed. The alternative feed source time is a reference time point at which samples of content are received from the alternative feed of the source. As such, the samples from the queries can be matched to the alternative feed (e.g., internet feed), and then determined to have been recorded from original feeds (e.g., over the air feed corresponding to the Internet feed).

FIG. 12 shows a flowchart of an example method that may be used with the method 400 of FIG. 4, according to an example implementation. As shown at blocks 436-438, additional functions can include receiving location information from the devices indicating geographic locations of the devices, and filtering identified matching queries based on the geographic locations of the devices matching to or being proximal to a geographic location of the source 124. In this example, to further disambiguate potential matches against a source, it may be known that the broadcast transmitter is located in a certain geographical area. Many client devices may also provide location information (e.g., GPS). Such information may be used to filter potential matches, thus restricting spurious matches to stations located near each other, e.g., within reception range of a given geo-located client device. If the geographic location of the devices does not match to the geographic location of the source 124, then the device is not likely to be in a broadcast area of that source 124. Thus, the sample from the device is unlikely to be a match to that source 124 (unless a source from which the device captured the sample is playing the same song as other sources in other geographic areas). As a result, the geographic filter can be helpful to narrow down possible sources of the samples of content from devices.

As a specific example, a certain station may be located and broadcast in San Francisco, and the client device may be located in New York. Based on a radius of broadcast of the San Francisco station, it can be determined that any data generated by queries from the client device in New York does not match to the San Francisco station.

FIG. 13 shows a flowchart of an example method that may be used with the method 400 of FIG. 4, according to an example implementation. As shown at block 440, additional functions can include determining the latency between the source 124 and the alternative feed 126 of the source 124 based on a given time difference in the distribution having a largest accumulation. In this example, the time difference most commonly observed is most likely to be correct and is taken as the latency.

Figure 14:
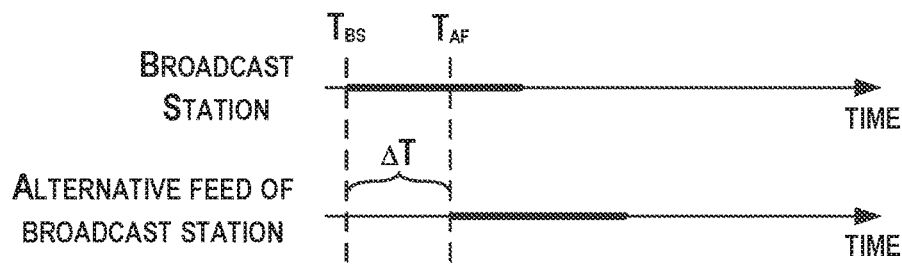
FIG. 14 is a conceptual illustration of example sources of content broadcast using multiple formats, according to an example implementation.

FIG. 14 is a conceptual illustration of example sources of content broadcast using multiple formats, according to an example implementation. As an example, a broadcast station may lead an alternative feed of the broadcast station (e.g., an internet stream of the station) by $\Delta T$. The broadcast station may broadcast a song at a beginning time $T_{BS}$ and the alternative feed may start broadcasting that song at a beginning time $T_{AF}$ due to buffering, for example. The latency between the source and the alternative feed of the source is then $\Delta T = (T_{BS} - T_{AF})$.

Figure 15:
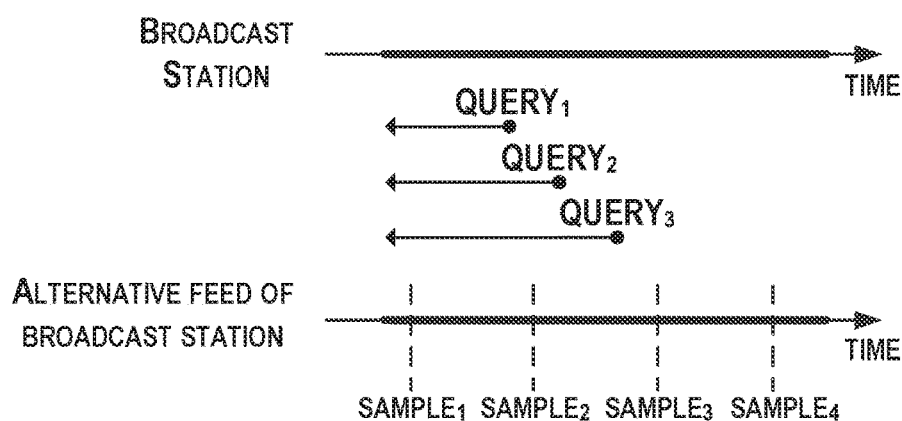
FIG. 15 is a conceptual illustration of queries received from devices for a broadcast station and samples received from a monitored alternative feed of the broadcast station, according to an example implementation.

FIG. 15 is a conceptual illustration of queries received from devices for a broadcast station and samples received from a monitored alternative feed of the broadcast station, according to an example implementation. For each sample of content from the alternative feed of the broadcast station, matching queries are identified that match to the same content. This indicates that a query is taken from a corresponding, broadcast station of the monitored alternative feed. Then, for the matching queries, a respective time difference between (i) a beginning time of the content in the sample of content from the alternative feed and (ii) a respective beginning time of the content in the respective matching query is determined and a distribution of the time differences over time is accumulated.

Figure 16:
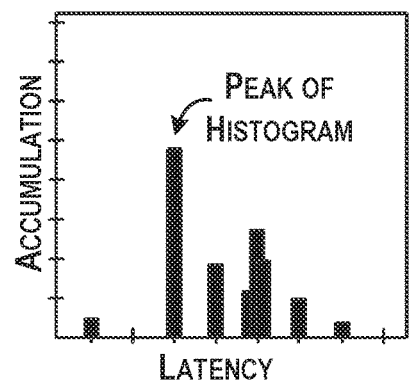
FIG. 16 is an illustration of an accumulation of a distribution of the time differences over time, according to an example implementation.

FIG. 16 is an illustration of an accumulation of a distribution of the time differences over time, according to an example implementation. In FIG. 16, a histogram of the time differences is shown and generated for each monitored alternative feed. Here, the peak of the histogram is then taken as the latency between the source and the alternative feed.

Within examples, many beneficial applications are possible once a query is attributed to a broadcast station or a specific source. As one example, a form of audience measurement can be employed to provide metrics around listenership to broadcast stations, based on a number of queries received and attributed to the broadcast stations. The example listenership can be provided at a song or media content item level, for example, to quantify a number of listeners to a specific broadcast station per song being broadcast, based on the queries received and attributed to the broadcast station when the song is being broadcast. Alternatively, the example listenership can be provided at a song or media content item level, for example, to quantify a number of listeners to a specific broadcast station per song being broadcast, based on the queries received and attributed to the broadcast station and resulting in a content identification of the song.

Quantification of a number of listeners to a broadcast station per song is unique and can be used as a measure of popularity of the song, for example. Thus, each query that is processed and attributed to a broadcast may then be associated with a channel code, and then used to perform various actions. For example, artists and artist management can be informed of top radio stations across the country that are playing their song, and advertisers can be informed of where their ads are causing queries for songs in the ads thus engaging with listeners.

By the term "substantially" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
   receiving, by one or more processors, queries from devices, wherein the queries include respective samples of content from a stream of content rendered by a source;
   receiving, by the one or more processors, samples of content from a stream of content rendered by an alternative feed of the source;
   for each sample of content from the alternative feed of the source, identifying respective matching queries that match to the same content as the sample of content from the alternative feed of the source;
   for each respective matching query, determining a respective relative time difference between a time that the content appears in the sample of content from the alternative feed and a time that the content appears in the respective matching query; and
   based, at least in part, on the determined respective relative time differences, determining, by the one or more processors, an identity of the alternative feed of the source.

2. The method of claim 1, wherein the identity of the alternative feed of the source comprises an identity of at least one of the following: a channel, a stream, or a station.

3. The method of claim 1, further comprising: determining, by the one or more processors, a latency between the source and the identified alternative feed of the source.

4. The method of claim 3, wherein determining the identity of the alternative feed of the source comprises: discerning between two or more stations based, at least in part, on the determined latency.

5. The method of claim 1, further comprising:
   receiving location information from the devices indicating geographic locations of the devices; and
   filtering identified matching queries based on the geographic locations of the devices matching to or being proximal to a geographic location of the source.

6. The method of claim 1, further comprising:
   providing metrics around listenership at a song or media content item level based, at least in part, on the determined identity of the alternative feed of the source.

7. The method of claim 1, wherein the source includes a radio broadcast, and the alternative feed of the source includes one or more of: a streaming internet feed and a streaming satellite feed corresponding to the radio broadcast.

8. A non-transitory computer readable medium having stored thereon instructions, that when executed by one or more processors, cause the one or more processors to perform functions comprising:
   receiving queries from devices, wherein the queries include respective samples of content from a stream of content rendered by a source;
   receiving samples of content from a stream of content rendered by an alternative feed of the source;
   for each sample of content from the alternative feed of the source, identifying respective matching queries that match to the same content as the sample of content from the alternative feed of the source;
   for each respective matching query, determining a respective relative time difference between a time that the content appears in the sample of content from the alternative feed and a time that the content appears in the respective matching query; and
   based, at least in part, on the determined respective relative time differences, determining an identity of the alternative feed of the source.

9. The non-transitory computer readable medium of claim 8, wherein the identity of the alternative feed of the source comprises an identity of at least one of the following: a channel, a stream, or a station.

10. The non-transitory computer readable medium of claim 8, wherein the functions further comprise: determining a latency between the source and the identified alternative feed of the source.

11. The non-transitory computer readable medium of claim 10, wherein determining the identity of the alternative feed of the source comprises: discerning between two or more stations based, at least in part, on the determined latency.

12. The non-transitory computer readable medium of claim 8, wherein the functions further comprise:
receiving location information from the devices indicating geographic locations of the devices; and
filtering identified matching queries based on the geographic locations of the devices matching to or being proximal to a geographic location of the source.

13. The non-transitory computer readable medium of claim 8, wherein the functions further comprise:
providing metrics around listenership at a song or media content item level based, at least in part, on the determined identity of the alternative feed of the source.

14. The non-transitory computer readable medium of claim 8, wherein the source includes a radio broadcast, and the alternative feed of the source includes one or more of: a streaming internet feed and a streaming satellite feed corresponding to the radio broadcast.

15. A system comprising:
one or more processors; and
non-transitory computer readable medium storing instructions, that when executed by the one or more processors, causes the one or more processors to perform functions comprising:
receiving queries from devices, wherein the queries include respective samples of content from a stream of content rendered by a source;
receiving samples of content from a stream of content rendered by an alternative feed of the source;
for each sample of content from the alternative feed of the source, identifying respective matching queries that match to the same content as the sample of content from the alternative feed of the source;
for each respective matching query, determining a respective relative time difference between a time that the content appears in the sample of content from the alternative feed and a time that the content appears in the respective matching query; and
based, at least in part, on the determined respective relative time differences, determining an identity of the alternative feed of the source.

16. The system of claim 15, wherein the identity of the alternative feed of the source comprises an identity of at least one of the following: a channel, a stream, or a station.

17. The system of claim 15, wherein the functions further comprise: determining a latency between the source and the identified alternative feed of the source.

18. The system of claim 17, wherein determining the identity of the alternative feed of the source comprises: discerning between two or more stations based, at least in part, on the determined latency.

19. The system of claim 15, wherein the functions further comprise:
receiving location information from the devices indicating geographic locations of the devices; and
filtering identified matching queries based on the geographic locations of the devices matching to or being proximal to a geographic location of the source.

20. The system of claim 15, wherein the functions further comprise:
providing metrics around listenership at a song or media content item level based, at least in part, on the determined identity of the alternative feed of the source.

* * * * *